(12) United States Patent
Xiao et al.

(10) Patent No.: US 12,127,215 B2
(45) Date of Patent: Oct. 22, 2024

(54) USER EQUIPMENT, BASE STATION, AND METHOD THEREOF

(71) Applicant: SHARP KABUSHIKI KAISHA, Sakai (JP)

(72) Inventors: Fangying Xiao, Shanghai (CN); Renmao Liu, Shanghai (CN); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 399 days.

(21) Appl. No.: 17/621,140

(22) PCT Filed: Jun. 23, 2020

(86) PCT No.: PCT/CN2020/097725
§ 371 (c)(1),
(2) Date: Dec. 20, 2021

(87) PCT Pub. No.: WO2020/259496
PCT Pub. Date: Dec. 30, 2020

(65) Prior Publication Data
US 2022/0353899 A1    Nov. 3, 2022

(30) Foreign Application Priority Data

Jun. 25, 2019 (CN) .......................... 201910558285.3

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04W 72/1263* (2013.01); *H04W 72/569* (2023.01); *H04W 80/02* (2013.01)

(58) Field of Classification Search
CPC ............. H04W 72/23; H04W 72/1263; H04W 72/569; H04W 80/02; H04W 72/1268;
(Continued)

(56) References Cited

U.S. PATENT DOCUMENTS

2022/0015135 A1* 1/2022 Yang .................... H04L 5/0064

OTHER PUBLICATIONS

OPPO, Other issue on intra-UE prioritization in IIoT, 3GPP TSG-RAN WG2 Meeting #106, Reno, US, May 13-17, 2019, R2-1906049. (Year: 2019).*

(Continued)

*Primary Examiner* — Shailendra Kumar
(74) *Attorney, Agent, or Firm* — ScienBiziP, P.C.

(57) ABSTRACT

According to the present invention, a method performed by user equipment (UE) is proposed, comprising: identifying, for a received uplink grant, a hybrid automatic repeat request (HARQ) process corresponding to the uplink grant; determining whether the uplink grant is used for a new transmission or a retransmission; and in the case of determining that the uplink grant is used for the new transmission, for an uplink grant with physical uplink shared channel (PUSCH) duration not overlapping with PUSCH duration of another uplink grant, or an uplink grant with PUSCH duration only overlapping with PUSCH duration of another uplink grant with a lower priority, or a dynamic uplink grant with PUSCH duration not overlapping with PUSCH duration of another uplink grant having a higher priority, if a corresponding MAC PDU (Media Access Control protocol data unit) is obtained, then instructing the identified HARQ process to trigger the new transmission of the MAC PDU.

2 Claims, 4 Drawing Sheets

(51) Int. Cl.
*H04W 72/1263* (2023.01)
*H04W 72/566* (2023.01)
*H04W 80/02* (2009.01)

(58) Field of Classification Search
CPC ............ H04W 74/004; H04W 74/0841; H04L 1/1812; H04L 1/1819; H04L 1/1822; H04L 1/188; H04L 1/1887; H04L 1/1806
See application file for complete search history.

(56) References Cited

OTHER PUBLICATIONS

OPPO, "Other issue on intra-UE prioritization in IIoT", R2-1906049, 3GPP TSG-RAN WG2 Meeting #106, Reno, US, May 13-17, 2019.
"3rd Generation Partnership Project; Technical Specification Group Radio Access Network; NR; Medium Access Control (MAC) protocol specification(Release 15)", 3GPP TS 38.321 V15.5.0 (Mar. 2019).
Nokia et al., "New WID: Support of NR Industrial Internet of Things (Iot)", RP-190728, 3GPP TSG RAN Meeting #83, Shenzhen, China, Mar. 18-21, 2019.

* cited by examiner

USER EQUIPMENT, BASE STATION, AND METHOD THEREOF

TECHNICAL FIELD

The present disclosure relates to the technical field of wireless communications. More specifically, the present disclosure relates to user equipment, a base station, and a method thereof.

BACKGROUND

In March 2019, a work item on the support of the NR Industrial Internet of Things (see Non-Patent Document: RP-190728: New WID: Support of NR Industrial Internet of Things (IoT)) was approved at the 3rd Generation Partnership Project (3GPP) RAN #83 plenary meeting. In industrial application scenarios, user equipment (UE) needs to process traffic flows from different applications or devices at the same time, and it is therefore necessary to consider priority processing and/or multiplexing when uplink/downlink data channel and control channel conflicts occur in the user equipment (intra-UE), and processing of resource conflicts occurring between a dynamic grant and a configured grant and between two or more configured grants. Accordingly, one of the goals of this work item is to enhance the resolution of resource conflicts occurring between a dynamic grant and a configured grant and between two or more configured grants. If a grant priority is processed at a Medium Access Control (MAC) layer, 3GPP working group 2 (RAN2) needs to define a physical uplink shared channel (PUSCH) grant priority processing mechanism based on logical channel (LCH) priority and logical channel priority (LCP) restrictions.

The 3GPP RAN2 #105bis meeting held in April 2019 reached the following conclusion: When a plurality of configured uplink grants (CGs) or downlink semi-persistent schedulings (SPSs) are configured, each CG or SPS is configured with one offset for calculating a hybrid automatic repeat request (HARQ) process number. The purpose of this conclusion is to map different configured uplink grants (or downlink SPSs) to different HARQ processes, so that HARQ processes associated with or mapped to or used by the configured uplink grants (or downlink SPSs) are different or have no overlap. The 3GPP RAN2 #106 meeting held in May 2019 reached the following conclusions: For de-prioritized PUSCH on dynamic grant, the UE should store the de-prioritized MAC PDU in the HARQ buffer, to allow gNB to schedule retransmission using the same HARQ process; for de-prioritized PUSCH on configured grants, a) the UE could store the de-prioritized MAC PDU in the HARQ buffer, to allow gNB to schedule retransmission; and b) FFS if the UE could transmit it using the subsequent radio resources e.g., associated with the same HARQ process. The above conclusions are at least applicable to the situation where a MAC entity has generated a MAC PDU for a dynamic grant or a configured uplink grant with a lower priority.

Based on the conclusions reached above, when a lower priority MAC PDU is stored in the HARQ buffer, an uplink grant (which may be a dynamic grant or a configured grant) is available at this time, and this uplink grant cannot be used to transmit the MAC PDU in the buffer. In this case, how the UE processes the available uplink grant is an issue to be considered. FIG. 1 shows an example description of this issue. At T1, a conflict occurs between a dynamic grant DG1 and a configured grant (CG) of different HARQ processes, and the dynamic grant has a higher priority, and a MAC PDU generated for the CG is stored in a buffer. At T2, a dynamic grant DG2 is received and the DG2 has the same HARQ process as that of the CG. At this time, because the MAC PDU generated for the CG is still stored in the buffer of the corresponding HARQ process, when the priority of the DG2 is lower than that of the CG, should a MAC PDU be generated for the DG2 to override the MAC PDU in the buffer? In addition, when the UE has a plurality of available uplink grants and PUSCH duration overlaps between these uplink grants, how to select an uplink grant to transmit data is an issue to be considered.

SUMMARY OF INVENTION In order to resolve at least part of the aforementioned issues, the present invention provides user equipment, a base station, and a method thereof, which can resolve a DG/CG PUSCH conflict between different HARQ processes, a CG/CG conflict between different HARQ processes, and an uplink grant/MAC PDU conflict in the same HARQ process by setting an enabling priority indicator.

In order to achieve the above objective, according to the present invention, proposed is a method performed by user equipment (UE), including: identifying, for a received uplink grant, a hybrid automatic repeat request (HARQ) process corresponding to the uplink grant; determining whether the uplink grant is used for a new transmission or a retransmission; and in the case of determining that the uplink grant is used for the new transmission, for an uplink grant with physical uplink shared channel (PUSCH) duration not overlapping with PUSCH duration of another uplink grant, or an uplink grant with PUSCH duration only overlapping with PUSCH duration of another uplink grant with a lower priority, or a dynamic uplink grant with PUSCH duration not overlapping with PUSCH duration of another uplink grant having a higher priority, if a corresponding MAC PDU (Media Access Control protocol data unit) is obtained, then instructing the identified HARQ process to trigger the new transmission of the MAC PDU.

Preferably, if the corresponding MAC PDU cannot be obtained, a HARQ buffer of the identified HARQ process is flushed or a configured grant timer of the identified HARQ process is stopped.

Preferably, in the case of determining that the uplink grant is used for the retransmission, if the uplink grant is indicated by a physical downlink control channel (PDCCH), and/or the PUSCH duration of the uplink grant overlaps with PUSCH duration of another uplink grant having a higher priority, the uplink grant is discarded.

Preferably, in the case of determining that the uplink grant is used for the new transmission, if a first enabling priority indicator is configured and the value of the indicator is a first predefined value, then for the uplink grant with the PUSCH duration not overlapping with the PUSCH duration of the other uplink grant, or the uplink grant with the PUSCH duration only overlapping with the PUSCH duration of the other uplink grant with the lower priority, or the dynamic uplink grant with the PUSCH duration not overlapping with the PUSCH duration of the other uplink grant with the higher priority, if the corresponding MAC PDU is obtained, the identified HARQ process is instructed to trigger the new transmission of the MAC PDU.

Preferably, if the received uplink grant is a configured uplink grant and the priority thereof is higher than the priority of a configured uplink grant in the same HARQ process or the priority of a MAC PDU that has not been transmitted or is waiting for an initial transmission in the HARQ buffer of the same HARQ process, then the MAC PDU corresponding to the received configured uplink grant is obtained, and the identified HARQ process is instructed to trigger the new transmission of the obtained MAC PDU.

Preferably, for an uplink grant with PUSCH duration overlapping with PUSCH duration of another uplink grant having a higher priority, if the uplink grant is used for a new transmission and a corresponding MAC PDU is obtained, the obtained MAC PDU is delivered to the identified HARQ process and the identified HARQ process is instructed to not trigger the new transmission of the MAC PDU; for the uplink grant with the PUSCH duration overlapping with the PUSCH duration of the other uplink grant with the higher priority, if the uplink grant is used for the new transmission but the corresponding MAC PDU is not obtained, then the HARQ buffer of the identified HARQ process is flushed or the configured grant timer of the identified HARQ process is stopped.

Preferably, the priority of the dynamic uplink grant is indicated in corresponding downlink control information (DCI), and the priority of the configured uplink grant is configured by a base station through Radio Resource Control (RRC) signaling.

In addition, according to the present invention, proposed is user equipment, comprising: a processor; and a memory, storing instructions, where the instructions, when run by the processor, perform the foregoing method.

In addition, according to the present invention, proposed is a method performed by a base station, including: indicating to user equipment (UE) a priority for a dynamic uplink grant and/or a priority for a configured uplink grant, and performing, by the UE, the foregoing method according to the priority indicated by the base station.

In addition, according to the present invention, proposed is a base station, including: a processor; and a memory, storing instructions, where the instructions, when run by the processor, perform the foregoing method.

According to the present invention as described above, it is possible to resolve a DG/CG PUSCH conflict between different HARQ processes, a CG/CG conflict between different HARQ processes, and an uplink grant/MAC PDU conflict in the same HARQ process by setting an enabling priority indicator.

BRIEF DESCRIPTION OF THE DRAWINGS

The above and other features of the present disclosure will become more apparent with the following detailed description in conjunction with the accompanying drawings.

DETAILED DESCRIPTION

Figure 1:
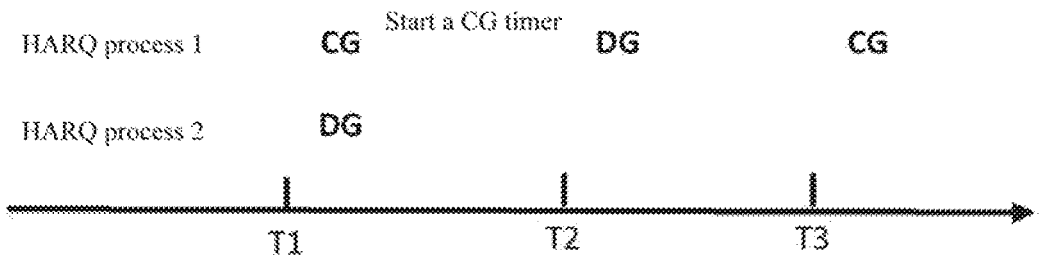
FIG. 1 shows a schematic diagram of an uplink grant conflict.

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

The following describes some terms involved in the present disclosure. Unless otherwise specified, the terms are the same as those used in the current latest versions of 3GPP protocols, which are excerpted herein as follows.

RRC: Radio Resource Control.
MAC: Medium Access Control.
PDCCH: Physical Downlink Control Channel.
PUSCH: Physical Uplink Shared Channel.
SDU: Service Data Unit.
PDU: Protocol Data Unit.
CG: Configured Grant or Configured Uplink Grant.
DG: Dynamic Grant, referring to an uplink grant dynamically received on a PDCCH, i.e., an uplink grant received on the PDCCH for a MAC entity's C-RNTI or TC-RNTI (temporary C-RNTI), or an uplink grant received on the PDCCH for the MAC entity's CS-RNTI (this uplink grant is used to configure a retransmission of a MAC PDU transmitted on the uplink grant, where it is considered that a received NDI is not toggled if the value of the NDI is 1). The uplink grant received on the PDCCH for the MAC entity's C-RNTI or TC-RNTI or CS-RNTI is an uplink grant indicated by the PDCCH scrambled with the MAC entity's C-RNTI or TC-RNTI or CS-RNTI. These two expressions can be used interchangeably.

HARQ information: The HARQ information transmitted by a DL-SCH or a UL-SCH consists of a new data indicator (NDI), a transport block size (TBS), a redundancy version (RV), and a HARQ process Identifier (HARQ process ID).

CS-RNTI: Configured Scheduling RNTI. ra-ResponseWindow: Random Access Response Window. UE receives a random access response in the random access response window.

In the present disclosure, in a serving cell, overlapping of PUSCH duration of a dynamic grant (DG) in a certain HARQ process with PUSCH duration of a configured grant (CG) in another HARQ process is referred to as a DG/CG PUSCH conflict between different HARQ processes or a DG/CG conflict between different HARQ processes. In a serving cell, overlapping of PUSCH duration of a CG in a certain HARQ process with PUSCH duration of a CG in another HARQ process is referred to as a CG/CG PUSCH conflict between different HARQ processes or a CG/CG conflict between different HARQ processes. Overlapping of PUSCH duration of a DG in a certain HARQ process with PUSCH duration of a CG in the HARQ process is referred to as a DG/CG conflict in the same HARQ process. A conflict occurring between an uplink grant in a certain HARQ process and a MAC PDU stored in a HARQ buffer of the HARQ process that has not been transmitted (or has been transmitted but has not been confirmed to be successfully transmitted) (this conflict is mainly a conflict in using the HARQ buffer, because each HARQ process is associated with one HARQ buffer, if a MAC PDU is generated for the uplink grant, then an existing MAC PDU stored in the HARQ buffer will be overridden/damaged) is referred to as an uplink grant/MAC PDU conflict in the same HARQ process. The DG/CG PUSCH conflict between different HARQ processes includes a situation where a PUSCH duration conflict occurs among one DG and a plurality of CGs in different HARQ processes. Similarly, the CG/CG PUSCH conflict in different HARQ processes also includes a PUSCH duration conflict among a plurality of CGs. Unless otherwise specified, the DG/CG or CG/CG conflict described in the embodiments of the present disclosure includes the various types of conflicts described above, and the conflict means that a conflicting DG and CG and two or more conflicting CGs are located in the same serving cell. In the present disclosure, a PUSCH overlap occurring between different uplink grants means that the different uplink grants overlap in the time domain.

When a configured grant timer of a corresponding HARQ process times out or a dynamic grant with an NDI toggled is received after completion of transmission of a MAC PDU, UE or a MAC entity considers that the MAC PDU is successfully transmitted.

When user equipment (UE) receives an uplink grant (a DG or a CG) (which may be performed through uplink grant reception in the UE), and the uplink grant encounters a DG/CG PUSCH conflict between different HARQ processes with another uplink grant (a CG or a DG) (a base station configures a CG for the UE), the priorities of the DG and the CG are determined, and a corresponding operation is performed according to the determination result (which may be performed through the uplink grant reception in the UE or performed by a HARQ entity). The specific description is as follows:

In one embodiment, a DG and/or a CG are/is used for a new transmission (for example, the DG is used for the new transmission when an NDI is toggled, and the CG is used for the new transmission when a corresponding configured grant timer configuredGrantTimer is not running). When a DG/CG PUSCH conflict between different HARQ processes occurs, if the priority of the DG is higher, the UE does not generate a MAC PDU for the CG and discards the CG. When the priority of the DG is lower, if the DG is used for the new transmission (i.e., the HARQ entity needs to obtain the MAC PDU), the MAC PDU is generated/obtained for the DG (which may be performed by the HARQ entity) and stored in a buffer of a corresponding HARQ process (which may be performed by the corresponding HARQ process). If the DG is used for a retransmission, the configured grant timer configuredGrantTimer is restarted (which may be performed by the HARQ entity).

The following specifically describes an embodiment of operations performed through uplink grant reception (UL grant reception) of user equipment (UE) when a DG/CG or CG/CG conflict occurs.

For a scenario where a DG/CG PUSCH conflict between different HARQ processes occurs, the UE receives an uplink grant on a PDCCH for a MAC entity's C-RNTI through uplink grant reception. If a first enabling priority indicator is configured and/or the value of the indicator is 1 or positive or true or setup or a first predefined value or the indicator is present (or the value of the indicator is 0 or negative or false or release or the indicator is absent), if PUSCH duration of the uplink grant does not overlap with PUSCH duration of another uplink grant or only overlaps with PUSCH duration of another uplink grant (such as a CG) with a priority lower or not higher than that of the uplink grant, then the uplink grant and/or associated HARQ information are/is indicated to a HARQ entity. Optionally, if a previous uplink grant of the same HARQ process (i.e., the HARQ process corresponding to the received uplink grant) delivered to the HARQ entity is a configured uplink grant or is an uplink grant for the MAC entity's CS-RNTI, it is considered that an NDI of the corresponding HARQ process has been toggled regardless of the value of the NDI. Otherwise (i.e., if the first enabling priority indicator is not configured or the value of the indicator is 0 or negative or false or release or the indicator is absent (or the value of the indicator is 1 or positive or true or setup or the indicator is present)), the uplink grant and/or the associated HARQ information are/is indicated to the HARQ entity. Optionally, if the previous uplink grant of the same HARQ process (i.e., the HARQ process corresponding to the received uplink grant) delivered to the HARQ entity is the configured uplink grant or is the uplink grant for the MAC entity's CS-RNTI, it is considered that the NDI of the corresponding HARQ process has been toggled regardless of the value of the NDI. It should be noted that the determination condition "whether the previous uplink grant of the same HARQ process delivered to the HARQ entity is the configured uplink grant or the uplink grant for the MAC entity's CS-RNTI" may be independent of the determination condition of whether the first enabling priority indicator is configured. That is, for the received uplink grant, it is considered that the NDI of the corresponding HARQ process has been toggled, provided that the previous uplink grant of the same HARQ process delivered to the HARQ entity is the configured uplink grant or the uplink grant for the MAC entity's CS-RNTI.

In a scenario where a DG/CG or CG/CG PUSCH conflict between different HARQ processes occurs, for each configured grant (configured and activated) of each serving cell, if a first enabling priority indicator is not configured or the value of the indicator is 0 or negative or false or release or a second predefined value or the indicator is absent (or the value of the indicator is 1 or positive or true or setup or the indicator is present) (this condition is optional), and if PUSCH duration of the configured grant does not overlap with PUSCH duration of another uplink grant, and further if a configured grant timer of a HARQ process corresponding to the configured grant is not running (this condition is optional) (in the case where all these three conditions need to be executed or any two thereamong are required, an execution order thereof includes but is not limited to the order listed above, and the order thereof may be arbitrarily altered to form a new embodiment), then the configured grant and/or associated HARQ information is indicated to a HARQ entity. Optionally, it is also considered that an NDI of the corresponding HARQ process has been toggled. If the first enabling priority indicator is configured and/or the value of the indicator is 1 or positive or true or setup or a first predefined value or the indicator is present (or the value of the indicator is 0 or negative or false or release or the indicator is absent) (this condition is optional), and if the PUSCH duration of the configured grant only overlaps with PUSCH duration of another uplink grant with a priority lower (or not higher) than that of the configured grant or the PUSCH duration of the uplink grant does not overlap with PUSCH duration of another uplink grant, and further if the configured grant timer of the corresponding HARQ process is not running (this condition is optional) (in the case where all these three conditions need to be executed or any two thereamong are required, an execution order thereof includes but is not limited to the order listed above, and the order thereof may be arbitrarily altered to form a new embodiment), then the configured grant and/or the associated HARQ information are/is indicated to the HARQ entity.

Optionally, it is also considered that the NDI of the corresponding HARQ process has been toggled.

Optionally, if the configured grant timer of the corresponding HARQ process is running, it is further necessary to determine whether the priority of the configured grant is higher than the priority of a MAC PDU stored (or stored and has not been transmitted) in a buffer of the HARQ process. If the priority of the configured grant is higher than the priority of the MAC PDU stored (or stored and has not been transmitted) in the HARQ process buffer, then the configured grant and/or the associated HARQ information are/is indicated to the HARQ entity. Optionally, it is also considered that the NDI of the corresponding HARQ process has been toggled (applicable to the case where a CG/MAC PDU conflict in the same HARQ process is supported).

Optionally, if the configured grant timer of the corresponding HARQ process is running, it is further necessary to determine whether a second enabling priority indicator is configured and whether the priority of the configured grant is higher than the priority of the MAC PDU stored (or stored and has not been transmitted) in the HARQ process buffer. If the second enabling priority indicator is configured and/or the value of the indicator is 1 or positive or true or setup or a first predefined value or the indicator is present (or the value of the indicator is 0 or negative or false or release or the indicator is absent) and the priority of the configured grant is higher than the priority of the MAC PDU stored (or stored and has not been transmitted) in the HARQ process buffer, then the configured grant and/or the associated HARQ information are/is indicated to the HARQ entity. Optionally, it is also considered that the NDI corresponding to the HARQ process has been toggled (applicable to the case where a CG/MAC PDU conflict in the same HARQ process is supported).

It should be noted that the other uplink grant described in the present disclosure includes an uplink grant received on the PDCCH and/or another configured grant and/or an uplink grant in a random access response. In an embodiment of the present disclosure, overlapping of PUSCH duration of a certain uplink grant with only PUSCH duration of another uplink grant with a priority lower or not higher than that of the uplink grant means that the PUSCH duration of the uplink grant does not overlap with PUSCH duration of another uplink grant with a priority not lower than or higher than that of the uplink grant.

In a scenario where a DG/MAC PDU conflict in the same HARQ process occurs, the UE receives an uplink grant on a PDCCH for a MAC entity's C-RNTI through uplink grant reception. If a second enabling priority indicator is configured and the value of the indicator is 1 or positive or true or setup or a first predefined value or the indicator is present (or the value of the indicator is 0 or negative or false or release or the indicator is absent), if a configured grant timer of a HARQ process corresponding to the uplink grant is not running, the uplink grant and/or associated HARQ information are/is indicated to the HARQ entity. Optionally, if a previous uplink grant of the same HARQ process (i.e., the HARQ process corresponding to the received uplink grant) delivered to the HARQ entity is a configured uplink grant or is an uplink grant for the MAC entity's CS-RNTI, it is considered that an NDI of the corresponding HARQ process has been toggled regardless of the value of the NDI. If the configured grant timer of the HARQ process corresponding to the uplink grant is running, and if the previous uplink grant of the same HARQ process (i.e., the HARQ process corresponding to the received uplink grant) delivered to the HARQ entity is the configured uplink grant or is the uplink grant for the MAC entity's CS-RNTI, and if the priority of the received uplink grant is higher than the priority of a MAC PDU stored (or stored and has not been transmitted) in a buffer of the HARQ process, then the received uplink grant and/or the associated HARQ information are/is indicated to the HARQ entity. Optionally, it is considered that the NDI of the corresponding HARQ process has been toggled.

It should be noted that in the present disclosure, the first enabling priority indicator is applied to a DG/CG or CG/CG PUSCH conflict between different HARQ processes, and the second enabling priority indicator is applied to a DG/CG or uplink grant/MAC PDU conflict in the same HARQ process. The enabling priority indicator (including the first enabling priority indicator and the second enabling priority indicator) being configured and/or the value of the indicator being 1 or positive or true or setup or the first predefined value or the indicator being present (or the value of the indicator being 0 or negative or false or release or the second predefined value or the indicator being absent) indicates that when a DG/CG or CG/CG PUSCH conflict between different HARQ processes or a DG/CG or uplink grant/MAC PDU conflict in the same HARQ process occurs, the system or UE supports comparing the priorities of the conflicting uplink grants and/or MAC PDU, and performs the operation defined in the embodiment according to the comparison result. The first enabling priority indicator being not configured or the value of the indicator being 0 or negative or false or release or the second predefined value or the indicator being absent (or the value of the indicator being 1 or positive or true or setup or the first predefined value or the indicator being present) indicates that the system or UE does not support the enabling priority indicator or always considers that the priority of a DG is higher when a DG/CG PUSCH conflict between different HARQ processes occurs, that is, considers that an NDI of a corresponding HARQ process has been toggled and delivers the DG and HARQ information thereof to a HARQ entity. In addition, the value of the enabling priority indicator is not limited to the listed values, but may also be other predetermined values, such as enabling and/or disabling. If the system or UE does not support the enabling priority indicator, it is only determined whether the other conditions are satisfied and the determination on whether the enabling priority indicator is configured is omitted. The first enabling priority indicator and the second enabling priority indicator may be combined into one indicator (denoted as an enabling priority indicator). Correspondingly, both the first enabling priority indicator and the second enabling priority indicator in the embodiments of the present disclosure are replaced with the enabling priority indicator.

In the latest released version 15 of 3GPP TS38.321 (TS38.321-f50), when a DG/CG conflict occurs, the priority of a DG is always considered to be higher than that of a CG, the DG always overrides the CG, and the DG is used to transmit data whereas the CG is discarded. In other words, when the DG is received, the DG is always delivered to a HARQ entity. The HARQ entity constructs a MAC PDU for the DG (for a new transmission) or instructs a HARQ process to perform a retransmission. When the CG is received, the CG is delivered to the HARQ entity only if PUSCH duration of the CG does not overlap with PUSCH duration of another uplink grant and a configured grant timer of a corresponding HARQ process is not running. In the present disclosure, the enabling priority indicator (including the first and/or second enabling priority indicator) is introduced to instruct the UE to handle a DG/CG PUSCH duration conflict between different HARQ processes and/or a CG/CG PUSCH duration conflict between different HARQ processes and/or a DG/CG conflict in the same HARQ process and/or an uplink grant/MAC PDU conflict in the same HARQ process (instructing the UE to compare priorities when the conflict occurs), so that a CG having a higher priority can override a DG (or another CG) with a lower priority, or the higher priority uplink grant is used to transmit data or the higher priority uplink grant is delivered to a HARQ entity or a MAC PDU is generated/obtained for the higher priority uplink grant or the lower priority DG is discarded. The enabling priority indicator (including the first and/or second enabling priority indicator) is pre-configured by a base station for the UE through RRC signaling/message (for example, the enabling priority indicator is configured when a configured grant is configured for the UE, and the enabling priority indicator may be included in an information element BWP-UplinkDedicated for configuring a UE-specific parameter of an uplink bandwidth part (BWP) or included in system information). The indicator may be used to indicate whether to use a higher priority CG and discard a lower priority DG when a DG/CG conflict occurs, or whether to deliver the lower priority DG to a HARQ entity or whether to generate/obtain a MAC PDU or whether to perform a retransmission or whether to process the lower priority DG or whether to submit the CG to the HARQ entity when the lower priority DG is received; or to indicate whether to use a higher priority CG and discard a lower priority CG when a CG/CG conflict occurs or whether to deliver the lower priority CG to a HARQ entity or whether to generate/obtain a MAC PDU when the lower priority CG is received. When a DG and CG conflict occurs in the same HARQ process, a higher priority uplink grant is delivered to a HARQ entity, and the HARQ entity generates a MAC PDU for the higher priority uplink grant. This will cause the lower priority CG to be discarded or a MAC PDU generated for the lower priority uplink grant (this MAC PDU may have not been transmitted, or has been transmitted but has not been confirmed to be correctly received (for example, a corresponding configured grant timer is running)) stored in the corresponding HARQ process to be flushed or overridden by a MAC PDU generated for the higher priority uplink grant. The first and/or second enabling priority indicator may be included in an information element ConfiguredGrantConfig. The information element ConfiguredGrantConfig is used to configure an uplink transmission without a dynamic grant according to two possible schemes. An actual uplink grant may be configured through RRC (type 1) or provided by a PDCCH (the address is a CS-RNTI) (type 2). When the value of the first and/or second enabling priority indicator is 1 or positive or true or setup or the indicator is present, a higher priority uplink grant is used to transmit data or the higher priority uplink grant is delivered to a HARQ entity or a MAC PDU is constructed for the higher priority uplink grant. When the value of the enabling priority indicator is 0 or negative or false or release or the indicator is absent, it is always considered that the priority of a DG is the highest or the priority of the DG is higher than that of a CG or the priority of the uplink grant is higher than the priority of a MAC PDU stored (or stored and has not been transmitted) in a corresponding HARQ process buffer. Vice versa.

The following describes a conflict handling procedure through specific embodiments.

Embodiment 1

Figure 2:
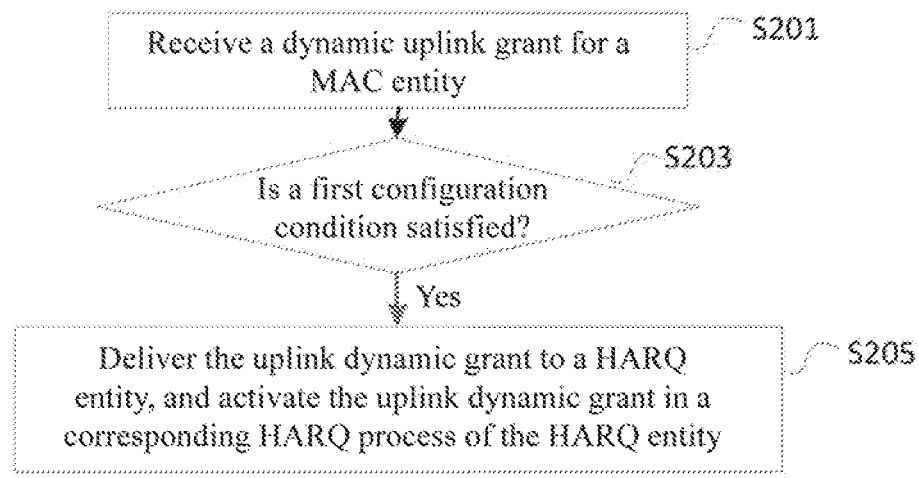
FIG. 2 is a flowchart showing a method performed by user equipment according to Embodiment 1 of the present invention.

FIG. 2 is a flowchart showing a method performed by user equipment according to Embodiment 1 of the present invention.

As shown in FIG. 2, in Embodiment 1 of the present disclosure, steps performed by the user equipment (UE) include: step S201, step S203, and step S205.

In step S201, the UE receives an uplink grant (dynamic uplink grant) on a PDCCH for a MAC entity's C-RNTI through uplink grant reception.

In step S203, for the received dynamic uplink grant, it is determined whether a first configuration condition described below is satisfied.

In step S205, when a previous uplink grant of the same HARQ process (i.e., a HARQ process corresponding to the received uplink grant) delivered to a HARQ entity is a configured uplink grant or is an uplink grant for the MAC entity's CS-RNTI, if the first configuration condition is satisfied, then it is considered that an NDI of the corresponding HARQ process has been toggled regardless of the value of the NDI. Optionally, the uplink dynamic grant is further delivered to the HARQ entity. The first configuration condition may be any one or any combination of the following:

1) The user equipment is configured with a first enabling priority indicator and/or the value of the indicator is 1 or positive or true or setup or a first predefined value or the indicator is present (or the value of the indicator is 0 or negative or false or release or the indicator is absent); and PUSCH duration of the received uplink grant does not overlap with PUSCH duration of another uplink grant or does not overlap with PUSCH duration of another uplink grant having a higher priority or only overlaps with PUSCH duration of another uplink grant with a priority lower or not higher than that of the uplink grant; and the priority of the received uplink grant is higher than the priority of a MAC PDU stored (or stored and has not been transmitted) in a buffer of the HARQ process (this condition is optional); and a configured grant timer of the HARQ process is running (this condition is optional).

2) The user equipment is configured with the first enabling priority indicator and/or the value of the indicator is 1 or positive or true or setup or the first predefined value or the indicator is present (or the value of the indicator is 0 or negative or false or release or the indicator is absent); and the PUSCH duration of the received uplink grant does not overlap with PUSCH duration of another uplink grant or does not overlap with PUSCH duration of another uplink grant having a higher priority or only overlaps with PUSCH duration of another uplink grant with a priority lower or not higher than that of the uplink grant; and the configured grant timer of the HARQ process is not running (this condition is optional).

3) The PUSCH duration of the received uplink grant does not overlap with PUSCH duration of another uplink grant or does not overlap with PUSCH duration of another uplink grant having a higher priority or only overlaps with PUSCH duration of another uplink grant with a priority lower or not higher than that of the uplink grant; and the priority of the received uplink grant is higher than the priority of the MAC PDU stored (or stored and has not been transmitted) in the HARQ process buffer (this condition is optional); and the configured grant timer of the HARQ process is running (this condition is optional).

4) The PUSCH duration of the received uplink grant does not overlap with PUSCH duration of another uplink grant or does not overlap with PUSCH duration of another uplink grant having a higher priority or only overlaps with PUSCH duration of another uplink grant with a priority lower or not higher than that of the uplink grant; and the configured grant timer of the HARQ process is not running (this condition is optional).

5) The user equipment is configured with a second enabling priority indicator and/or the value of the indicator is 1 or positive or true or setup or a first predefined value or the indicator is present (or the value of the indicator is 0 or negative or false or release or the indicator is absent), and the configured grant timer corresponding to the HARQ process is running (this condition is optional), and the priority of the received uplink grant is higher than the priority of the MAC PDU stored (or stored and has not been transmitted) in the HARQ process buffer.

5) The priority of the received uplink grant is higher than the priority of the MAC PDU stored (or stored and has not been transmitted) in the HARQ process buffer; and the configured grant timer of the HARQ process is running (this condition is optional).

6) The received uplink grant has a higher priority than the priority of a previous uplink grant (or the received uplink grant has a higher priority than a previous uplink grant for which a MAC PDU has been generated but has not been transmitted, or the received uplink grant has a higher priority than a previous uplink grant for which a MAC PDU has been generated but has been discarded); and the configured grant timer corresponding to the HARQ process is running (this condition is optional).

7) The configured grant timer corresponding to the HARQ process corresponding to the received uplink grant is not running.

8) The first enabling priority indicator is not configured or the value of the indicator is 0 or negative or false or release or a second predefined value or the indicator is absent (or the value of the indicator is 1 or positive or true or setup or the indicator is present), and optionally, the PUSCH duration of the received uplink grant does not overlap with PUSCH duration of another uplink grant or does not overlap with PUSCH duration of another uplink grant having a higher priority or only overlaps with PUSCH duration of another uplink grant with a priority lower or not higher than that of the uplink grant.

In the above first configuration conditions (1-8), all the conditions can be divided into two classes. One class is used to handle a DG/CG PUSCH duration conflict between different HARQ processes. This class of condition includes any one or any combination of the following: whether the first enabling priority indicator is configured, and whether the PUSCH duration of the received uplink grant overlaps with PUSCH duration of another uplink grant. The other class of conditions is used to handle a DG/CG or uplink grant/MAC PDU conflict in the same HARQ process. This class of conditions includes any one or any combination of the following: whether the second enabling priority indicator is configured, whether the corresponding configured grant timer is running, whether the priority of the received uplink grant is higher than the priority of the MAC PDU stored (or stored and has not been transmitted) in the HARQ process buffer, and whether the priority of the received uplink grant is higher than that of the previous uplink grant. These two classes of conditions are only required when the system or UE supports handling the corresponding type of conflict. For example, if the system or UE does not support handling the DG/CG or uplink grant/MAC PDU conflict in the same HARQ process (in other words, it is always considered that the received Uplink grant always has a higher priority, and a MAC PDU generated for the uplink grant will override the current MAC PDU stored in the HARQ buffer), then the first configuration conditions do not include the condition for handling the DG/CG or uplink grant/MAC PDU conflict in the same HARQ process. In addition, the priority of the received uplink grant in the present disclosure being higher than the priority of the MAC PDU stored (or stored and has not been transmitted) in the HARQ process buffer may be replaced by the priority of the received uplink grant being not lower than the priority of the MAC PDU stored (or stored and has not been transmitted) in the HARQ process buffer. In addition, each of the above conditions (1-8) contains a plurality of determination conditions (except condition (7)), and the execution order of these determination conditions in each item includes but is not limited to the order listed above. The order of these determination conditions may also be altered to form a new embodiment.

Furthermore, if the UE receives the uplink grant on the PDCCH for the MAC entity's C-RNTI through the uplink grant reception, and the first configuration condition is satisfied, then at least one of the following operations may be performed:
1) deliver the received uplink grant and associated HARQ information to the HARQ entity; and
2) if the corresponding HARQ process is configured with the configured grant timer, start or restart the configured grant timer for the corresponding HARQ process.

Optionally, if the UE receives the uplink grant on the PDCCH for the MAC entity's C-RNTI through the uplink grant reception and the first configuration condition is not satisfied, at least one of the following operations is performed:
1) if the previous uplink grant of the same HARQ process delivered to the HARQ entity is the uplink grant for the MAC entity's C-RNTI, deliver the received uplink grant and the associated HARQ information to the HARQ entity;
2) if the corresponding HARQ process is a HARQ process configured for a configured grant and the configured grant timer is configured, start or restart the configured grant timer of the corresponding HARQ process; and
3) discard the received uplink grant.

In another embodiment, the UE receives the uplink grant on the PDCCH for the MAC entity's C-RNTI through the uplink grant reception. If the previous uplink grant of the same HARQ process (i.e., the HARQ process corresponding to the received uplink grant) delivered to the HARQ entity is a configured uplink grant or is an uplink grant for the MAC entity's CS-RNTI, it is considered that the NDI of the corresponding HARQ process has been toggled regardless of the value of the NDI. If the aforementioned first configuration condition is satisfied, another operation that can be performed when the aforementioned first configuration condition is satisfied may be performed.

In the embodiment of the present disclosure, the MAC PDU that is stored in the HARQ process buffer and has not been transmitted means that the HARQ process buffer is not empty and the MAC PDU stored therein has not been transmitted or the HARQ process buffer includes a MAC PDU that has not been transmitted. When a conflict occurs between a DG and a CG or between a CG and a CG corresponding to different HARQ processes, the HARQ entity generates a MAC PDU for a lower priority uplink grant and stores the MAC PDU in the buffer, but because the corresponding uplink grant has a lower priority, the uplink grant is discarded and the MAC PDU is not transmitted using the uplink grant, the MAC PDU refers to a MAC PDU that has not been transmitted, or may be referred to as a MAC PDU waiting for an initial transmission.

Embodiment 2

Figure 3:
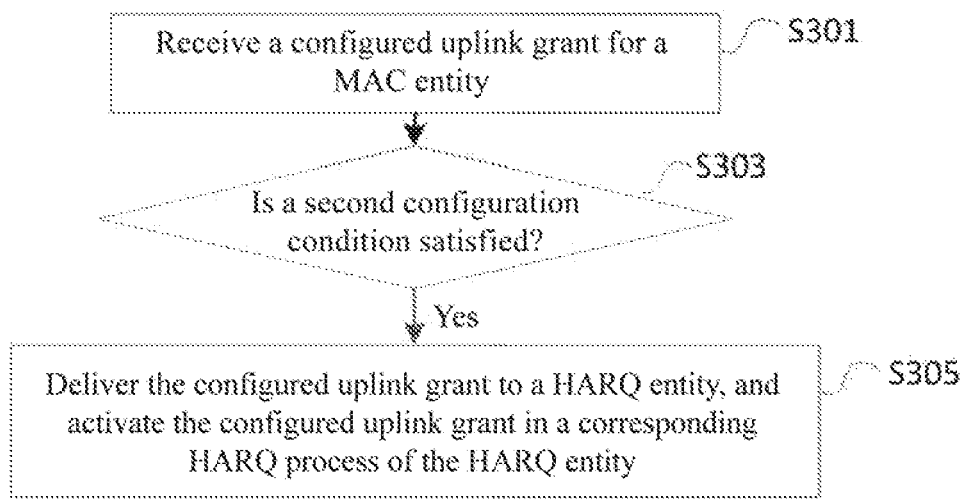
FIG. 3 is a flowchart showing a method performed by user equipment according to Embodiment 2 of the present invention.

FIG. 3 is a flowchart showing a method performed by user equipment according to Embodiment 2 of the present invention.

As shown in FIG. 3, in Embodiment 2 of the present invention, steps performed by the user equipment (UE) include: step S301, step S303, and step S305.

In Embodiment 2, in step S301, for each serving cell, a configured uplink grant for a MAC entity (the MAC entity can perform the following operations) is received.

In step S303, for the received configured uplink grant, it is determined whether a second configuration condition is satisfied.

In step S305, if the second configuration condition is satisfied, one or a plurality of the following operations (for example, delivering the configured uplink grant to a HARQ entity) are performed:
1) Set a HARQ process ID to a HARQ process ID corresponding to PUSCH duration of this configured uplink grant.
2) If a configured grant timer corresponding to the HARQ process is not running; or, a buffer corresponding to the HARQ process is empty or the configured grant timer corresponding to the HARQ process is running but the buffer of the HARQ process is empty (this condition is optional), consider that an NDI of the corresponding HARQ process has been toggled, and/or deliver the configured uplink grant and HARQ information associated therewith to the HARQ entity (optional). Optionally, if the configured grant timer of the corresponding HARQ process is running, and there is a MAC PDU that has not been transmitted in the HARQ buffer (for example, the MAC PDU is generated for a previous configured uplink grant with a lower priority), consider that the NDI of the corresponding HARQ process has not been toggled.
3) Deliver the configured uplink grant and the HARQ information associated therewith to the HARQ entity (if this operation is performed in 2), the operation will not be performed herein).
4) Start the configured grant timer of the corresponding HARQ process (this operation is performed only if the configured grant timer is configured).

Optionally, if the second configuration condition is not satisfied, the configured uplink grant is discarded or the configured uplink grant is not delivered to the HARQ entity.

Specifically, the second configuration condition may be any one or any combination of the following:
1) The UE is configured with a first enabling priority indicator and the value of the indicator is 1 or positive or true or setup or a first predefined value or the indicator is present (or the value of the indicator is 0 or negative or false or release or the indicator is absent); and the configured grant timer of the corresponding HARQ process is not running (optional).
2) The UE is configured with the first enabling priority indicator and the value of the indicator is 1 or positive or true or setup or the first predefined value or the indicator is present (or the value of the indicator is 0 or negative or false or release or the indicator is absent); and (or) PUSCH duration of the configured uplink grant overlaps with PUSCH duration of another uplink grant in the same serving cell but the configured uplink grant has a higher priority or the configured uplink grant does not overlap with PUSCH duration of another uplink grant in the same serving cell or the PUSCH duration of the configured uplink grant only overlaps with PUSCH duration of another uplink grant with a priority lower (or not higher) than that of the configured uplink grant; and the configured grant timer of the corresponding HARQ process is running but the priority of the configured grant is higher (compared with the priority of the MAC PDU in the buffer) (optional) or the configured grant timer of the HARQ process corresponding to the configured uplink grant is not running.
3) The UE is not configured with the first enabling priority indicator or the value of the indicator is 0 or negative or false or release or a second predefined value or the indicator is absent (or the value of the indicator is 1 or positive or true or setup or the indicator is present), and/or the PUSCH duration of the configured uplink grant does not overlap with PUSCH duration of an uplink grant in the same serving cell received on the PDCCH or PUSCH duration of another configured uplink grant in the same serving cell or PUSCH duration of an uplink grant in a random access response; and the configured grant timer of the corresponding HARQ process is not running. Optionally, the configured grant timer of the corresponding HARQ process is running, and a second enabling priority indicator is configured or the value of the indicator is 0 or negative or false or release or a second predefined value or the indicator is absent (or the value of the indicator is 1 or positive or true or setup or the indicator is present) and the configured grant has a higher priority (compared with the priority of the MAC PDU in the buffer).
4) The PUSCH duration of the configured uplink grant overlaps with the PUSCH duration of the uplink grant in the same serving cell received on the PDCCH or overlaps with PUSCH duration of another configured uplink grant in the same serving cell, but the configured uplink grant has a higher priority; or the PUSCH duration of the configured uplink grant does not overlap with the PUSCH duration of the uplink grant in the random access response but overlaps with the PUSCH duration of the uplink grant in the same serving cell received on the PDCCH or another configured uplink grant in the same serving cell but the configured uplink grant has a higher priority.
5) The UE is configured with the second enabling priority indicator and the value of the indicator is 1 or positive or true or setup or a first predefined value or the indicator is present (or the value of the indicator is 0 or negative or false or release or the indicator is absent); and the configured grant timer of the corresponding HARQ process is running (optional) but the configured grant has a higher priority (compare with the priority of the MAC PDU in the buffer) or the configured grant timer of the HARQ process corresponding to the configured uplink grant is not running.

Optionally, in the above second configuration conditions (1-5), if the PUSCH duration of the received or available configured uplink grant overlaps with the PUSCH duration of the uplink grant in the random access response, then the configured uplink grant is discarded or the configured uplink grant is not delivered to the HARQ entity (i.e., it is always considered that the uplink grant in the random access response has the highest priority, which is also applicable to other embodiments of the present disclosure).

In the above second configuration conditions (1-5), all the conditions can be divided into two classes. One class is used to handle a DG/CG or DG/CG PUSCH duration conflict between different HARQ processes. This type of conditions includes any one or any combination of the following: whether the first enabling priority indicator is configured, whether the PUSCH duration of the received configured uplink grant overlaps with PUSCH duration of another uplink grant (e.g., another configured uplink grant or a DG or an uplink grant in a random access response). The other class of conditions is used to handle a configured uplink grant/MAC PDU conflict in the same HARQ process. This class of conditions includes any one or any combination of the following: whether the second enabling priority indicator is configured, and whether the corresponding configured grant timer is running but the configured grant has a higher priority (compared with the priority of the MAC PDU in the buffer). These two classes of conditions are only required when the system or UE supports handling the corresponding type of conflict. For example, if the system or UE does not support handling the configured uplink grant/MAC PDU conflict in the same HARQ process (in other words, if the corresponding configured grant timer is running, the configured uplink grant is not delivered to the HARQ entity), then the first configuration conditions do not include the condition for handling the configured uplink grant/MAC PDU conflict in the same HARQ process. In addition, if the system or UE does not support the enabling priority indicator (including the first enabling priority indicator and the second enabling priority indicator), the determinations in the above second configuration conditions (1-5) on whether the enabling priority indicator is configured may all be deleted. In addition, for items including a plurality of determination conditions in the above conditions (1-5), the execution order of these determination conditions includes but is not limited to the order listed above, and the order of these determination conditions may be altered to form a new embodiment.

In the embodiment of the present disclosure, the uplink grant for the MAC entity's C-RNTI or CS-RNTI or TC-RNTI or the uplink grant received on the PDCCH for the MAC entity's C-RNTI or CS-RNTI or TC-RNTI refers to an uplink grant indicated by the PDCCH scrambled with the C-RNTI or CS-RNTI or TC-RNTI.

In the embodiment of the present disclosure, the priority of a dynamic grant may be indicated in downlink control information (DCI) corresponding thereto, and the priority of a configured grant may be configured by a base station through RRC signaling/message or in DCI for activating the configured grant, or may be the highest priority of a logical channel (i.e., the priority of a highest priority logical channel corresponding to the contained data) corresponding to data that can be transmitted or can be multiplexed or to be multiplexed or has been multiplexed by this uplink grant (performed through a multiplexing and assembly procedure according to a logical channel priority (LCP)) or the priority of a highest priority logical channel corresponding to data contained in a MAC PDU to be generated for this uplink grant. The priority of the MAC PDU refers to the priority of the highest priority logical channel corresponding to the data contained in the MAC PDU or the priority of the uplink grant corresponding to the MAC PDU (the MAC PDU is a MAC PDU generated for the uplink grant). The priority comparison of a certain uplink grant and a MAC PDU means comparing the priority of the uplink grant with the priority of an uplink grant corresponding to the MAC PDU or comparing the priority of a MAC PDU generated for the uplink grant and the priority of the MAC PDU. If the priority of an uplink grant is determined by a MAC PDU corresponding thereto or the priority of a highest priority logical channel corresponding thereto, then the priority comparison between uplink grants is comparing the priorities of MAC PDUs corresponding thereto or comparing the priorities of highest priority logical channels corresponding thereto. Correspondingly, when the corresponding uplink grant is processed through uplink grant reception or by the HARQ entity, first the priority of the uplink grant is obtained from a "procedure for determining the priority of an uplink grant" before the priority of the uplink grant is compared with that of another uplink grant, for example, the priority is obtained from a multiplexing and assembly procedure, and then the obtained priority is compared with the priority of the other uplink grant. When the "procedure for determining the priority of an uplink grant" (such as the multiplexing and assembly procedure) receives an instruction to obtain the priority of an uplink grant, the procedure determines, according to a restriction on a logical channel priority (LCP) (or a mapping restriction configured by RRC for each logical channel), the priority of a highest priority logical channel corresponding to data that can be transmitted or can be multiplexed or to be multiplexed by the uplink grant, or uses the priority of a highest priority logical channel among logical channels selected or preselected for the uplink grant as the priority of the uplink grant (there is data available for transmission on the logical channel selected by the "procedure for determining the priority of an uplink grant"; if there is no data available for transmission on all logical channels according to an LCP rule, the priority of the corresponding uplink grant is a predefined value, such as 0. It is also possible to respectively predefine different values for cases where there is only a MAC CE available for transmission and there are no data and MAC CE available for transmission), and indicates the priority to the uplink grant reception or the HARQ entity. In addition, if the priority of a certain uplink grant has been obtained/received through the uplink grant reception, when the uplink grant is delivered to the HARQ entity through the uplink grant reception, the priority of the uplink grant may also be delivered to the HARQ entity. For the HARQ entity, if the priority of a certain uplink grant is received from the uplink grant reception, the HARQ entity does not need to obtain the priority of the uplink grant from the "procedure for determining the priority of an uplink grant," but if the priority of a certain uplink grant is not received, the HARQ entity can obtain the priority of the uplink grant from the "procedure for determining the priority of an uplink grant". Optionally, when the HARQ entity delivers the uplink grant to the HARQ process, the priority of the uplink grant is also indicated to the HARQ process. The following specifically describes an operation embodiment performed by the HARQ entity of the UE when a DG/CG or CG/CG conflict occurs.

The following describes a processing method of the received uplink grant by the HARQ entity.

For an uplink grant with PUSCH duration not overlapping with PUSCH duration of another uplink grant, or for an uplink grant with PUSCH duration only overlapping with PUSCH duration of another uplink grant with a lower priority, or for an uplink grant with PUSCH duration overlapping with PUSCH duration of another uplink grant with a lower priority, or for a dynamic grant with PUSCH duration not overlapping with PUSCH duration of another uplink grant having a higher priority, a HARQ process of the uplink grant is identified, and the following operations are performed on the identified HARQ process:

If the uplink grant is used for a new transmission (i.e., a new transmission condition is satisfied, e.g., a condition for obtaining a MAC PDU given in step 002/003 in the following embodiment), then a MAC PDU is obtained.

If the MAC PDU is obtained, the MAC PDU, the uplink grant, and HARQ information of a transport block of the identified HARQ process are delivered to the identified HARQ process, to instruct the identified HARQ process to trigger the new transmission, and if a condition for starting a configured grant timer of the identified HARQ process is satisfied, the configured grant timer of the identified HARQ process is started or restarted.

If no MAC PDU is obtained, a HARQ buffer of the identified HARQ process is flushed, and optionally, the configured grant timer of the identified HARQ process (if running) is stopped.

Optionally, for an uplink grant with PUSCH duration overlapping with PUSCH duration of another uplink grant having a higher priority, if the uplink grant is used for the new transmission (i.e., the new transmission condition is satisfied, e.g., a condition for obtaining a MAC PDU given in the following embodiment), then a MAC PDU is obtained. If the MAC PDU is obtained, the MAC PDU is delivered to the identified HARQ process, and the uplink grant and/or the HARQ information of the transport block of the identified HARQ process are/is delivered to the identified HARQ process (this operation is optional), and the identified HARQ process is instructed to not trigger the new transmission (or the identified HARQ process is not instructed to trigger the new transmission or the identified HARQ process is instructed to store the MAC PDU) (this operation is also optional), and if the condition for starting the configured grant timer of the identified HARQ process is satisfied, the configured grant timer of the identified HARQ process is started or restarted. If no MAC PDU is obtained, the HARQ buffer of the identified HARQ process is flushed, and optionally, the configured grant timer of the identified HARQ process (if running) is stopped.

Optionally, for an uplink grant with PUSCH duration overlapping with PUSCH duration of another uplink grant having a higher priority, if the uplink grant is used for the new transmission (i.e., the new transmission condition is satisfied, e.g., the condition for obtaining a MAC PDU given in the following embodiment), the HARQ buffer of the identified HARQ process is flushed, and optionally, the configured grant timer of the identified HARQ process (if running) is stopped.

Optionally, for an uplink grant for a retransmission (i.e., the new transmission condition is not satisfied), if PUSCH duration of the uplink grant overlaps with PUSCH duration of another uplink grant having a higher priority, then the uplink grant is discarded. Optionally, the identified HARQ process is instructed to not trigger the retransmission (or the identified HARQ process is not instructed to trigger the retransmission). Optionally, if the condition for starting the configured grant timer of the identified HARQ process is satisfied, the configured grant timer of the identified HARQ process is stared or restarted.

The following is another processing method of the received uplink grant by the HARQ entity.

For each uplink grant, a HARQ process of the uplink grant is identified. For the identified HARQ process, if the uplink grant is used for a new transmission (i.e., a new transmission condition is satisfied, e.g., a condition for obtaining a MAC PDU given in step 002/003 of the following embodiment), then a MAC PDU is obtained. If the MAC PDU is obtained, the MAC PDU is delivered to the identified HARQ process. Optionally, the uplink grant and/or HARQ information of a transport block of the identified HARQ process are/is delivered to the identified HARQ process. Optionally, if PUSCH duration of the uplink grant overlaps with PUSCH duration of another uplink grant having a higher priority, then the identified HARQ process is instructed to not trigger the new transmission or the identified HARQ process is not instructed to trigger the new transmission or the identified HARQ process is instructed to store the MAC PDU, and if a condition for starting a configured grant timer of the identified HARQ process is satisfied, the configured grant timer of the identified HARQ process is started or restarted. If the PUSCH duration of the uplink grant only overlaps with PUSCH duration of another uplink grant with a priority lower (or not higher) than that of the uplink grant, the identified HARQ process is instructed to trigger the new transmission. Optionally, the uplink grant and/or the HARQ information of the transmission block of the identified HARQ process are/is also delivered to the identified HARQ process (if the operation has been performed before determination on the priority of the uplink grant and the priority of the other uplink grant, the operation is not performed herein). If no MAC PDU is obtained, a HARQ buffer of the identified HARQ process is flushed, and optionally, the configured grant timer of the identified HARQ process (if running) is stopped. If the uplink grant is used for retransmission and one of the following conditions is satisfied, the uplink grant is discarded, and the configured grant timer of the identified HARQ process (if running) is stopped: (1) if the uplink grant is indicated by a PDCCH scrambled with a CS-RNTI and the HARQ buffer of the identified HARQ process is empty; (2) if the uplink grant is part of a bundle of uplink grants and no MAC PDU is obtained for this bundle of uplink grants; (3) if the uplink grant is part of a bundle of uplink grants and PUSCH duration of the uplink grant overlaps with PUSCH duration of another uplink grant indicated by PDCCH duration or a random access response in this serving cell; and (4) if the PUSCH duration of the uplink grant overlaps with PUSCH duration of another uplink grant with a priority not lower (or higher) than that of the uplink grant.

The condition for starting the configured grant timer of the identified HARQ process is: if the uplink grant corresponds to a CS-RNTI, or the uplink grant is a configured uplink grant, or the uplink grant corresponds to a C-RNTI and the identified HARQ process is configured with a configured uplink grant, then if the configured grant timer is configured, the configured grant timer is started or restarted when the transmission is performed.

It should be noted that the enabling priority indicator (including the first or second enabling priority indicator) defined in the operation embodiment performed by the uplink grant reception is also applicable to the operation embodiment performed by the HARQ entity. In this case, in the operation embodiment performed by the HARQ entity, only when the enabling priority indicator is configured and/or the value of the indicator is 1 or positive or true or setup or the first predefined value or the indicator is present (or the value of the indicator is 0 or negative or false or release or the indicator is absent), it is determined whether the PUSCH duration of the received uplink grant overlaps with PUSCH duration of another uplink grant, and the operation defined in the embodiment is performed according to the determination result. If the enabling priority indicator is not configured or the value of the indicator is 0 or negative or false or the second predefined value or the indicator is absent (or the value of the indicator is 1 or positive or true or the indicator is present), operations are performed according to the method in which determination on whether the PUSCH duration of the received uplink grant overlaps with PUSCH duration of another uplink grant is not performed in the embodiment (i.e., consider the condition is satisfied). In the operation embodiment performed by the HARQ entity, the determination on the enabling priority indicator and the priority comparison between uplink grants are the same as those in the first configuration conditions (1-8) and the second configuration conditions (1-5) defined in the operation embodiment performed through the uplink grant reception.

The above two processing methods are described in more detail below through specific embodiments.

Embodiment 3

Figure 4:
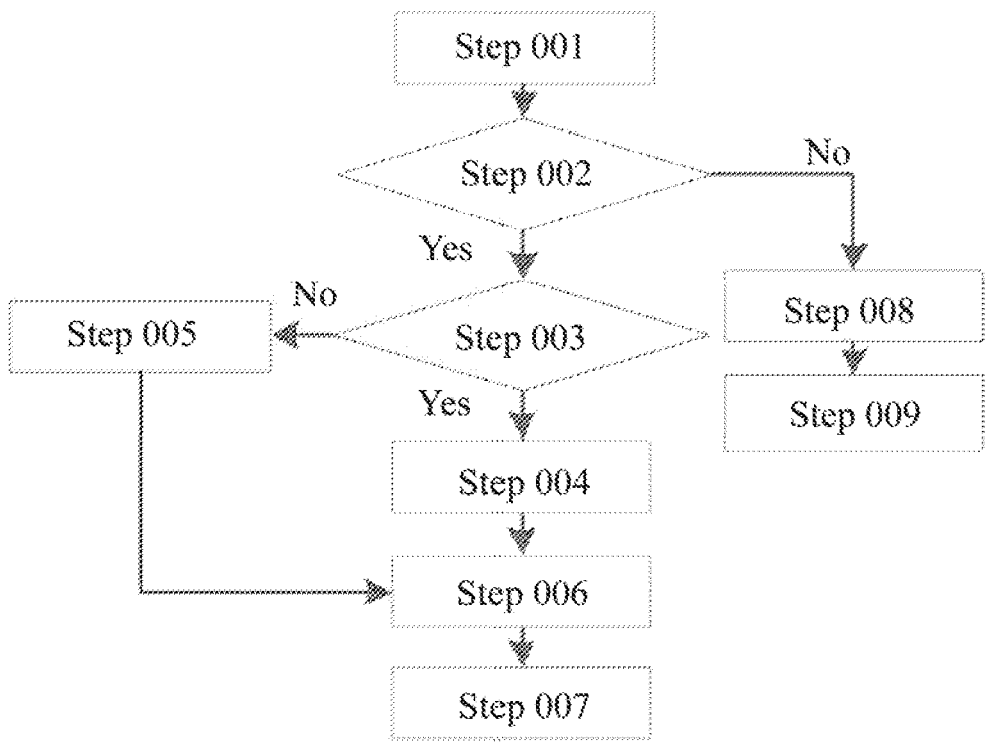
FIG. 4 is a flowchart showing a method performed by user equipment according to Embodiment 3 of the present invention.

FIG. 4 is a flowchart showing a method performed by user equipment according to Embodiment 3 of the present invention.

As shown in FIG. 4, in Embodiment 3 of the present invention, steps performed by the user equipment (UE) include: steps 001 to 009.

In this embodiment, for each uplink grant (or for an uplink grant with PUSCH duration not overlapping with PUSCH duration of another uplink grant, or for an uplink grant with PUSCH duration only overlapping with PUSCH duration of another uplink grant with a lower priority, or for a dynamic grant with PUSCH duration not overlapping with PUSCH duration of another uplink grant having a higher priority), a HARQ entity performs the following operations:

In step 001, a HARQ process corresponding to the uplink grant is identified, and step 002 is performed for each identified HARQ process.

In step 002, if the received uplink grant is not indicated by a PDCCH corresponding to a TC-RNTI, and an NDI provided in corresponding HARQ information has been toggled compared to the value of the NDI in a previous transmission of a transport block of this HARQ process; or if the received uplink grant is indicated by a PDCCH scrambled with a C-RNTI and a HARQ buffer of the identified HARQ process is empty; or if the uplink grant is received from a random access response; or if the uplink grant received in an ra-ResponseWindow is indicated by the PDCCH scrambled with the C-RNTI and this PDCCH successfully completes a random access procedure initiated for beam failure recovery; or if the uplink grant is part of a bundle of configured uplink grants and may be used for an initial transmission and no MAC PDU has been obtained for this bundle of configured uplink grants, then step 003 is performed (at least one of the conditions is satisfied); otherwise (none of the conditions is satisfied), step 008 (uplink grant for retransmission) is performed.

In step 003, if there is a MAC PDU in a message 3 (Msg3) buffer and the uplink grant is received from the random access response, or if there is a MAC PDU in the message 3 (Msg3) buffer and the uplink grant received in the ra-ResponseWindow is indicated by the PDCCH scrambled with the C-RNTI and this PDCCH successfully completes the random access procedure initiated for beam failure recovery, then step 004 is performed (at least one of the conditions is satisfied); otherwise (none of the conditions is satisfied), step 005 is performed.

In step 004, the MAC PDU is obtained from the Msg3 buffer. If the size of the uplink grant does not match the size of the obtained MAC PDU and the random access procedure is successfully completed upon receiving the uplink grant, a multiplexing and assembly entity is instructed to include a MAC subPDU carrying a MAC SDU from the obtained MAC PDU in a subsequent uplink transmission, to obtain the MAC PDU from the multiplexing and assembly entity for transmission. Step 006 is performed.

In step 005, the MAC PDU to transmit is obtained from the multiplexing and assembly entity (if any). Step 006 is performed.

In step 006, if the MAC PDU to transmit has been obtained, the following operations are performed (and the process ends after the following operations are performed):
 (1) Deliver the MAC PDU and/or the uplink grant and/or the HARQ information of this transport block to the identified HARQ process.
 (2) Preferably, instruct the identified HARQ process to trigger a new transmission. Alternatively, if the PUSCH duration of the uplink grant does not overlap with PUSCH duration of another uplink grant or the PUSCH duration of the uplink grant only overlaps with PUSCH duration of another uplink grant with a lower priority or the uplink grant is indicated by the PDCCH scrambled with the C-RNTI and a configured uplink grant overlapping with the uplink grant in PUSCH duration has a priority not higher than that of the uplink grant (the above determination conditions in this operation are optional, for example, only when the HARQ entity performs step 001 and subsequent steps for each uplink grant, it is determined whether these conditions are satisfied and subsequent operations are performed when any one of the conditions is satisfied), instruct the identified HARQ process to trigger the new transmission and/or deliver the uplink grant and/or the HARQ information of this transport block to the identified HARQ process; otherwise (optional), deliver the uplink grant and/or the HARQ information of this transport block to the identified HARQ process and/or instruct the identified HARQ process to not trigger the new transmission (or skip instructing the identified HARQ to trigger the new transmission or instruct the identified HARQ process to store the MAC PDU) and/or discard the uplink grant. Optionally, if the uplink grant is indicated by the PDCCH scrambled with the C-RNTI and the PUSCH duration of the uplink grant overlaps with PUSCH duration of another uplink grant having a higher priority (this determination condition is optional, for example, only when the HARQ entity performs step 001 and subsequent steps for each uplink grant, it is determined whether this condition is satisfied and subsequent operations are performed when the condition is satisfied), then deliver the uplink grant and/or the HARQ information of this transport block to the identified HARQ process and/or instruct the identified HARQ process to not trigger the new transmission (or skip instructing the identified HARQ to trigger the new transmission or instruct the identified HARQ process to store the MAC PDU) and/or discard the uplink grant.
 (3) If the received uplink grant corresponds to the CS-RNTI, or the received uplink grant is a configured uplink grant, or the received uplink grant corresponds to the C-RNTI and the identified HARQ process is configured with a configured uplink grant, if a configured grant timer is configured, start or restart the configured grant timer configuredGrantTimer when the transmission is performed;

otherwise (no MAC PDU to transmit is obtained), step 007 is performed.

In step 007, the HARQ buffer of the identified HARQ process is flushed. Optionally, if the configured grant timer is running, the configured grant timer is stopped. End.

In step 008, if a third configuration condition is satisfied, the uplink grant is discarded; if the third configuration condition is not satisfied, step 009 is performed. The third configuration condition may be at least one of the following:
(1) if the uplink grant is indicated by the PDCCH scrambled with the CS-RNTI and the HARQ buffer of the identified HARQ process is empty;
(2) if the uplink grant is part of a bundle of uplink grants and no MAC PDU has been obtained for this bundle of uplink grants;
(3) if the uplink grant is part of a bundle of uplink grants and the PUSCH of the uplink grant overlaps with a PUSCH of another uplink grant indicated by a PDCCH or a random access response in this serving cell; and
(4) the uplink grant is indicated by the PDCCH and/or the PUSCH duration of the uplink grant overlaps with PUSCH duration of another uplink grant having a higher priority.

Optionally, step 008 further includes: if the uplink grant is discarded, if the uplink grant is indicated by the PDCCH scrambled with the CS-RNTI and/or if the configured grant timer corresponding to the identified HARQ process is running, then the configured grant timer is stopped.

Optionally, in step 008, after the uplink grant is discarded, if the configured grant timer corresponding to the identified HARQ process is running (performed only when the configured uplink grant and/or the configured grant timer are/is configured in the HARQ process), then the configured grant timer is stopped.

Optionally, step 008 further includes: if the uplink grant is indicated by the PDCCH scrambled with the CS-RNTI and the HARQ buffer of the identified HARQ process is empty, if the configured grant timer corresponding to the identified HARQ process is running (performed only when the configured uplink grant and/or the configured grant timer are/is configured in the HARQ process), then the configured grant timer is stopped.

Optionally, step 008 further includes: if the uplink grant is indicated by the PDCCH and/or the PUSCH duration of the uplink grant overlaps with PUSCH duration of another uplink grant having a higher priority, if the configured grant timer corresponding to the identified HARQ process is running (performed only when the configured uplink grant and/or the configured grant timer are/is configured in the HARQ process), then the configured grant timer is stopped.

In step 009, the uplink grant and the HARQ information (redundancy version) corresponding to the transport block are delivered to the identified HARQ process; the identified process is instructed to trigger a retransmission; if the received uplink grant corresponds to the CS-RNTI or the received uplink grant is the configured uplink grant or the received uplink grant corresponds to the C-RNTI and the identified HARQ process is configured with the configured uplink grant, then if the configured grant timer is configured, the configured grant timer configuredGrantTimer is started or restarted when the transmission is performed.

Embodiment 4

Figure 5:
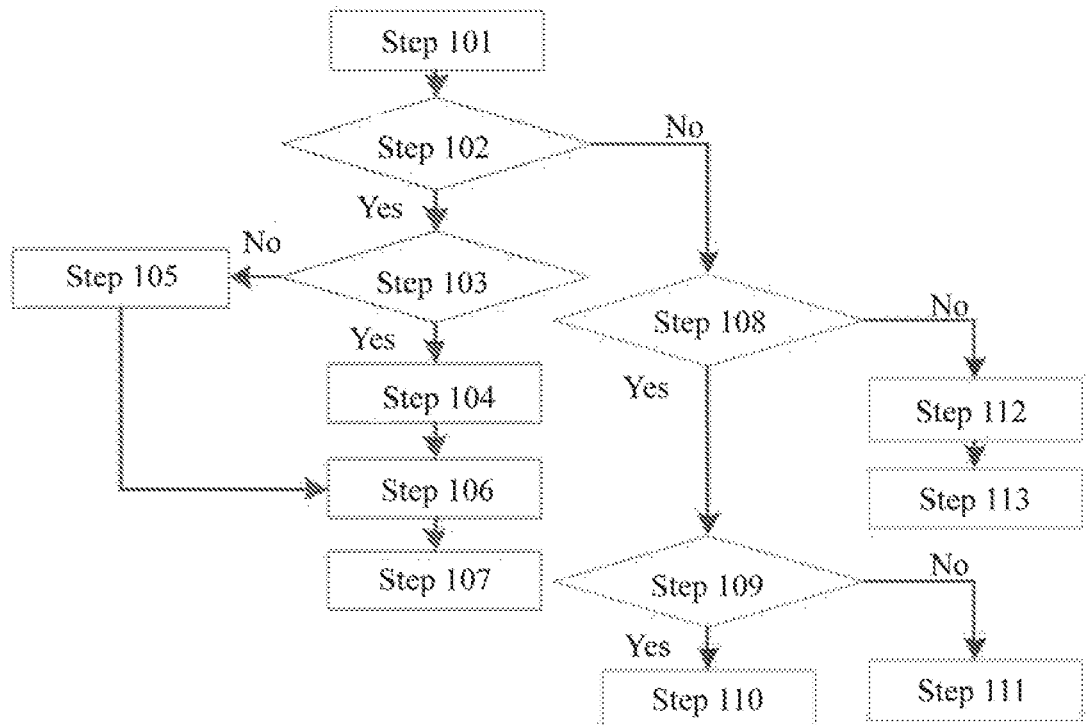
FIG. 5 is a flowchart showing a method performed by user equipment according to Embodiment 4 of the present invention.

FIG. 5 is a flowchart showing a method performed by user equipment according to Embodiment 4 of the present invention.

As shown in FIG. 5, in Embodiment 4 of the present invention, steps performed by the user equipment include steps 101 to 113.

In this embodiment, for each uplink grant (or for an uplink grant with PUSCH duration not overlapping with PUSCH duration of another uplink grant, or for an uplink grant with PUSCH duration only overlapping with PUSCH duration of another uplink grant with a lower priority, or for a dynamic grant with PUSCH duration not overlapping with PUSCH duration of another uplink grant having a higher priority), a HARQ entity performs the following operations:

In step 101, a HARQ process corresponding to the uplink grant is identified, and step 102 is performed for each identified HARQ process.

In step 102, if the received uplink grant is not indicated by a PDCCH corresponding to a TC-RNTI, and an NDI provided in corresponding HARQ information has been toggled compared to the value of the NDI in a previous transmission of a transport block of this HARQ process; or if the received uplink grant is indicated by a PDCCH scrambled with a C-RNTI and a HARQ buffer of the identified HARQ process is empty; or if the uplink grant is received from a random access response; or if the uplink grant received in a ra-ResponseWindow is indicated by the PDCCH scrambled with the C-RNTI and this PDCCH successfully completes a random access procedure initiated for beam failure recovery; or if the uplink grant is part of a bundle of configured uplink grants and may be used for an initial transmission and no MAC PDU has been obtained for this bundle of configured uplink grants, then step 103 is performed (at least one of the conditions is satisfied); otherwise (none of the conditions is satisfied), step 108 is performed.

In step 103, if there is a MAC PDU in a message 3 (Msg3) buffer and the uplink grant is received from the random access response, or if there is a MAC PDU in the message 3 (Msg3) buffer and the uplink grant received in the ra-ResponseWindow is indicated by the PDCCH scrambled with the C-RNTI and this PDCCH successfully completes the random access procedure initiated for beam failure recovery, then step 104 is performed (at least one of the conditions is satisfied); otherwise (none of the conditions is satisfied), step 105 is performed.

In step 104, the MAC PDU is obtained from the Msg3 buffer. If the size of the uplink grant does not match with the size of the obtained MAC PDU and the random access procedure is successfully completed upon receiving the uplink grant, a multiplexing and assembly entity is instructed to include a MAC subPDU carrying a MAC SDU from the obtained MAC PDU in a subsequent uplink transmission, to obtain the MAC PDU from the multiplexing and assembly entity for transmission. Step 106 is performed.

In step 105, the MAC PDU to transmit is obtained from the multiplexing and assembly entity (if any). Step 106 is performed.

In step 106, if the MAC PDU to transmit has been obtained, the following operations are performed (and the process ends after the following operations are performed):
(1) Deliver the MAC PDU and/or the uplink grant and/or the HARQ information of this transport block to the identified HARQ process.
(2) Preferably, instruct the identified HARQ process to trigger a new transmission. Alternatively, if the PUSCH duration of the uplink grant does not overlap with PUSCH duration of another uplink grant or the PUSCH duration of the uplink grant only overlaps with PUSCH duration of another uplink grant with a lower priority or the uplink grant is indicated by the PDCCH scrambled with the C-RNTI and a configured uplink grant overlapping with the uplink grant in PUSCH duration has a priority not higher that of the uplink grant (the above determination conditions in this operation are optional, for example, only when the HARQ entity performs step 101 and subsequent steps for each uplink grant, it is determined whether these conditions are satisfied and subsequent operations are performed when any one of the conditions is satisfied), instruct the identified HARQ process to trigger the new transmission and/or deliver the uplink grant and/or the HARQ information of this transport block to the identified HARQ process; otherwise (optional), deliver the uplink grant and/or the HARQ information of this transport block to the identified HARQ process and/or instruct the identified HARQ process to not trigger the new transmission (or skip instructing the identified HARQ to trigger the new transmission or instruct the identified HARQ process to store the MAC PDU) and/or discard the uplink grant. Optionally, if the uplink grant is indicated by the PDCCH scrambled with the C-RNTI and the PUSCH duration of the uplink grant overlaps with PUSCH duration of another uplink grant having a higher priority (this determination condition is optional, for example, only when the HARQ entity performs step 101 and subsequent steps for each uplink grant, it is determined whether this condition is satisfied and subsequent operations are performed when the condition is satisfied), then deliver the uplink grant and/or the HARQ information of this transport block to the identified HARQ process and/or instruct the identified HARQ process to not trigger the new transmission (or skip instructing the identified HARQ to trigger the new transmission or instruct the identified HARQ process to store the MAC PDU) and/or discard the uplink grant.

(3) If the received uplink grant corresponds to the CS-RNTI, or the received uplink grant is a configured uplink grant, or the received uplink grant corresponds to the C-RNTI and the identified HARQ process is configured with a configured uplink grant, if a configured grant timer is configured, start or restart the configured grant timer configuredGrantTimer when the transmission is performed;

otherwise (no MAC PDU to transmit is obtained), step 107 is performed.

In step 107, the HARQ buffer of the identified HARQ process is flushed. Optionally, if the configured grant timer is running, the configured grant timer is stopped. End.

In step 108, if the received uplink grant is indicated by the PDCCH scrambled with the C-RNTI and another uplink grant delivered to the same HARQ process (the HARQ process identified for the received uplink grant) of this HARQ entity is indicated by a PDCCH scrambled with a CS-RNTI or is a configured uplink grant, or if the received uplink grant is a configured uplink grant and another uplink grant delivered to the same HARQ process of this HARQ entity is indicated by a PDCCH scrambled with a CS-RNTI or C-RNTI or there is a MAC PDU in the HARQ buffer of the identified HARQ process that has not been transmitted or is waiting for an initial transmission, step 109 is performed; otherwise, step 112 is performed.

In step 109, if the priority of the received configured grant is higher (higher than the priority of the CG in the same HARQ process or the MAC PDU that has not been transmitted or waiting for the initial transmission, or not lower than the priority of the CG in the same HARQ process or the MAC PDU that has not been transmitted or waiting for the initial transmission), then step 110 is performed; otherwise, step 111 is performed.

In step 110, the MAC PDU to transmit is obtained from the multiplexing and assembly entity; the MAC PDU, the uplink grant, and the HARQ information of this transport block are delivered to the identified HARQ process; the identified HARQ process is instructed to trigger the new transmission; the configured grant timer corresponding to the identified HARQ process is started or restarted when the transmission is performed (performed only if the configured grant timer is configured for the configured uplink grant). End.

In step 111, if the received uplink grant is indicated by the PDCCH scrambled with the C-RNTI, the uplink grant is discarded. If the received uplink grant is the configured uplink grant and the previous uplink grant of the same HARQ process (the HARQ process identified for the received uplink grant) of this HARQ entity is indicated by the PDCCH scrambled with the CS-RNTI or is the configured uplink grant, then the uplink grant and the HARQ information (redundancy version) of this TB are delivered to the identified HARQ process; the identified HARQ process is instructed to trigger a retransmission, and the configured grant timer of this HARQ process (if configured) is started. If none of the above conditions is satisfied, the uplink grant is discarded. End.

In step 112 (the same as step 008 in Embodiment 3 above), if a fourth configuration condition is satisfied, the uplink grant is discarded; if the third configuration condition is not satisfied, step 113 is performed. The fourth configuration condition may be at least one of the following:

(1) if the uplink grant is indicated by the PDCCH scrambled with the CS-RNTI and the HARQ buffer of the identified HARQ process is empty;

(2) if the uplink grant is part of a bundle of uplink grants and no MAC PDU has been obtained for this bundle of uplink grants;

(3) if the uplink grant is part of a bundle of uplink grants and the PUSCH of the uplink grant overlaps with a PUSCH of another uplink grant indicated by a PDCCH or a random access response in this serving cell; and (4) the uplink grant is indicated by the PDCCH and/or the PUSCH duration of the uplink grant overlaps with PUSCH duration of another uplink grant having a higher priority.

Optionally, in step 112, if the uplink grant is discarded, if the uplink grant is indicated by the PDCCH scrambled with the CS-RNTI and/or if the configured grant timer corresponding to the identified HARQ process is running, then the configured grant timer is stopped.

Optionally, in step 112, if the uplink grant is indicated by the PDCCH scrambled with the CS-RNTI and the HARQ buffer of the identified HARQ process is empty, if the configured grant timer corresponding to the identified HARQ process is running (performed only when the configured uplink grant and/or the configured grant timer are/is configured in the HARQ process), then the configured grant timer is stopped.

Optionally, in step 112, if the uplink grant is indicated by the PDCCH and/or the PUSCH duration of the uplink grant overlaps with PUSCH duration of another uplink grant having a higher priority, if the configured grant timer corresponding to the identified HARQ process is running (performed only when the configured uplink grant and/or the configured grant timer are/is configured in the HARQ process), then the configured grant timer is stopped.

In step 113 (the same as step 009 in the previous Embodiment 3), the uplink grant and the HARQ information (redundancy version) corresponding to the transport block are delivered to the identified HARQ process; the identified process is instructed to trigger a retransmission; if the received uplink grant corresponds to the CS-RNTI or the received uplink grant is the configured uplink grant or the received uplink grant corresponds to the C-RNTI and the identified HARQ process is configured with the configured uplink grant, then if the configured grant timer is configured, the configured grant timer ConfiguredGrantTimer is started or restarted when the transmission is performed.

It should be noted that in the embodiments of the present disclosure, each HARQ process supports one transport block (TB) or two TBs (in space division multiplexing MIMO, two TBs are supported).

It should be noted that if the HARQ entity generates/obtains a MAC PDU for a lower priority uplink grant (PUSCH duration of the uplink grant overlaps with PUSCH duration of the higher priority uplink grant) and stores the MAC PDU in the buffer or if the lower priority uplink grant has data to transmit, a multiplexing and assembly procedure is instructed to include a buffered data indication MAC CE or a low priority data trigger indication when generating a MAC PDU for the higher priority uplink grant. Optionally, if the buffered data indication is triggered and not cancelled, when a MAC entity is allocated an uplink resource for a new transmission, the multiplexing and assembly procedure is instructed to generate a buffered data indication MAC CE, and the triggered buffered data indication is cancelled. The lower priority uplink grant having data to transmit may be determined by the HARQ entity according to a priority obtained from a "procedure for determining the priority of an uplink grant". Therefore, the lower priority uplink grant having data to transmit may also be described as that the priority of the lower priority uplink grant is not a value predefined for a case where there is no data and/or no data and MAC CE to transmit, for example, the priority of the lower priority uplink grant is greater than 0. The buffered data indication MAC CE may indicate whether there is buffered data in the lower priority uplink grant to which a PUSCH duration overlap occurs or indicate whether there is buffered data in a buffer of a HARQ process identified for the lower priority uplink grant. For example, this is represented by a bitmap. Each bit in the bitmap corresponds to a lower priority uplink grant to which a PUSCH duration overlap occurs. When there is buffered data in a buffer of a HARQ process corresponding to the uplink grant, the corresponding bit is set to 1 (or 0), otherwise set to 0 (or 1). Preferably, if the buffered data indication MAC CE is included in a MAC PDU generated for a dynamic grant, the configured grants to which PUSCH duration overlaps occur are corresponded to bits from left to right (or from right to left) in the bitmap in ascending order (or descending order) of configured grant identifiers. For example, the 0th bit of the bitmap corresponds to a configured grant with the smallest configured grant identifier to which a PUSCH duration overlap occurs, and so on. If the buffered data indication MAC CE is included in a MAC PDU generated for a configured grant, the 0th bit of the bitmap corresponds to dynamic, the 1st bit corresponds to a configured grant with the smallest configured grant identifier to which a PUSCH duration overlap occurs, and so on. The configured grant identifier is configured by a base station for each configured grant through RRC signaling/message, for example, included in an information element ConfiguredGrantConfig, and configured when the corresponding configured grant is configured. Optionally, the priority of the buffered data indication MAC CE is lower than the priority of a PHR MAC CE (including a single entry PHR MAC CE and a multiple entry PHR MAC CE) and higher than the priority of data from a logical channel (except data from a UL-CCCH)

The following specifically describes an operation embodiment performed by a HARQ process of the UE when a DG/CG or CG/CG conflict occurs.

In one embodiment, if a HARQ entity requests to store a MAC PDU corresponding to a transport block (TB) or if the HARQ entity requests not to trigger a new transmission or retransmission or if the HARQ process does not receive from the HARQ entity an instruction to trigger a new transmission or a retransmission, the HARQ process performs at least one of the following operations:
1) store an uplink grant received from the HARQ entity and corresponding to a stored MAC PDU; and
2) generate no transmission or retransmission.

It should be noted that unless otherwise specified in the present disclosure, a grant refers to an uplink grant, a dynamic grant refers to an uplink grant received on a PDCCH for a MAC entity's C-RNTI or CS-RNTI for a certain serving cell (in other words, an uplink grant received on the PDCCH), where if the dynamic grant is for the MAC entity's CS-RNTI, then an NDI is 1, and a configured grant is a configured uplink grant.

The following describes an embodiment of a processing method when a plurality of uplink grants are received in a multiplexing and assembly procedure (which may also be a logical channel priority (LCP) procedure).

In one embodiment, if the multiplexing and assembly procedure receives an uplink grant with PUSCH duration overlapping with PUSCH duration of another uplink grant, and the uplink grant has a higher priority, and the multiplexing and assembly procedure has generated a MAC PDU for the lower priority uplink grant, then a MAC control element (CE) (including a buffer status report (BSR) and a power headroom report (PHR)) that has been included in the MAC PDU generated for the lower priority uplink grant is included in a MAC PDU generated for the higher priority uplink grant (if the MAC PDU includes a BSR, the BSR needs to be recalculated and generated), if the MAC PDU generated for the lower priority uplink grant includes only the MAC CE, then all MAC CEs are included in the MAC PDU generated for the higher priority uplink grant (the MAC CE includes a BSR, a PHR, and a configured grant acknowledgement MAC CE), and the generated MAC PDU for the lower priority uplink grant is cancelled (i.e., a HARQ buffer of a HARQ process corresponding to the lower priority uplink grant is flushed), and optionally, a configured grant timer (if running) of the HARQ process corresponding to the lower priority uplink grant is also stopped.

In one embodiment, if a plurality of uplink grants of a serving cell are received, a MAC PDU is generated for an uplink grant having a higher priority first, and a MAC CE (including a BSR, a PHR, and a configured grant acknowledgement MAC CE, if any) is included in this MAC PDU. If the received plurality of uplink grants have the same priority, and if a dynamic grant is included therein, a MAC PDU is generated for the dynamic grant and a MAC CE that needs to be transmitted is included therein.

[Variation Embodiment]

Figure 6:
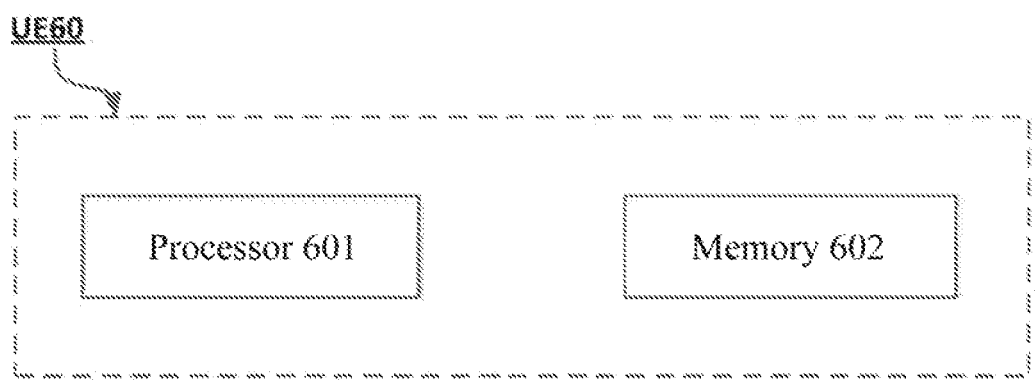
FIG. 6 is a block diagram schematically showing user equipment according to the present invention.

Hereinafter, FIG. 6 is used to illustrate user equipment that can perform the method performed by user equipment described in detail above in the present invention as a variant embodiment.

FIG. 6 is a block diagram showing user equipment (UE) involved in the present invention.

As shown in FIG. 6, the user equipment (UE) 60 includes a processor 601 and a memory 602. The processor 601 may include, for example, a microprocessor, a microcontroller, or an embedded processor. The memory 602 may include, for example, a volatile memory (for example, a random access memory (RAM)), a hard disk drive (HDD), a non-volatile memory (for example, a flash memory), or other memories. The memory 602 stores program instructions. The instructions, when run by the processor 601, can perform the foregoing method performed by user equipment as described in detail in the present invention.

Figure 7:
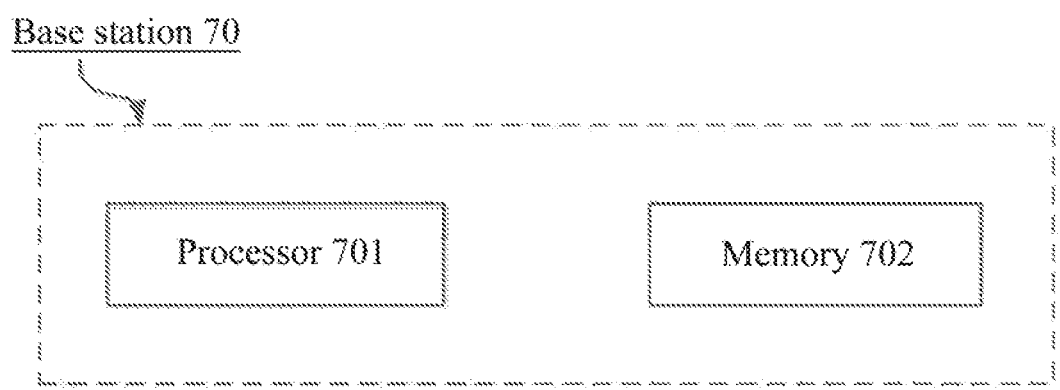
FIG. 7 is a block diagram schematically showing a base station according to the present invention.

Hereinafter, FIG. 7 is used to illustrate a base station that can perform the method performed by a base station described in detail above according to the present invention as a variant embodiment.

FIG. 7 is a block diagram showing a base station according to the present invention.

As shown in FIG. 7, the base station 70 includes a processor 701 and a memory 702. The processor 701 may include, for example, a microprocessor, a microcontroller, an embedded processor, and the like. The memory 702 may include, for example, a volatile memory (such as a random access memory (RAM)), a hard disk drive (HDD), a non-volatile memory (such as a flash memory), or other memories. The memory 702 stores program instructions. The instructions, when run by the processor 701, can execute the foregoing method performed by a base station described in detail in the present invention.

Further, the present invention provides a method performed by a base station. According to the method performed by a base station of the present invention, the base station indicates to user equipment (UE) a priority for a dynamic uplink grant and/or a priority for a configured uplink grant. According to the priority indicated by the base station, the UE performs the operations described in the above embodiments.

The computer-executable instructions or program running on the device according to the present invention may be a program that enables the computer to implement the functions of the embodiments of the present invention by controlling the central processing unit (CPU). The program or information processed by the program may be temporarily stored in a volatile memory (for example, a random access memory (RAM)), a hard disk drive (HDD), a non-volatile memory (for example, a flash memory), or other memory systems.

The computer-executable instructions or program for implementing the functions of the embodiments of the present invention may be recorded on a computer-readable storage medium. The corresponding functions may be achieved by reading programs recorded on the recording medium and executing them by the computer system. The phrase "computer system" herein may be a computer system embedded in the device, which may include operating systems or hardware (e.g., peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A method performed by a user equipment (UE), the method comprising:

receiving a first dynamic uplink grant on a physical downlink control channel (PDCCH) for a medium access control (MAC) entity's cell-radio network temporary identifier (C-RNTI);

if a previous uplink grant, delivered to a hybrid automatic repeat request (HARQ) entity for a same HARQ process associated with the first dynamic uplink grant, was either an uplink grant received for the MAC entity's configured scheduling-RNTI (CS-RNTI) or a configured uplink grant, considering a new data indicator (NDI) to have been toggled for a corresponding HARQ process regardless of a value of the NDI;

determining whether the UE is configured with a first indication and whether there is no overlapping physical uplink shared channel (PUSCH) duration of the configured uplink grant a priority of which is higher than a priority of the first dynamic uplink grant; and obtaining a MAC protocol data unit (PDU) to transmit from a Multiplexing and assembly entity by the HARQ entity corresponding to the HARQ process in a case that the UE is not configured with the first indication or in a case that the UE is configured with the first indication and there is no overlapping PUSCH duration of the configured uplink grant the priority of which is higher than the priority of the first dynamic uplink grant, wherein the first indication is received via a Radio Resource Control (RRC) message and is used to indicate that the UE is configured with a prioritization between overlapping uplink grants based on a Logical Channel priority.

2. A user equipment (UE), comprising:

receiver circuitry configured to receive a first dynamic uplink grant on a physical downlink control channel (PDCCH) for a medium access control (MAC) entity's cell-radio network temporary identifier (C-RNTI); and controller circuitry configured to:
- consider a new data indicator (NDI) to have been toggled for a corresponding hybrid automatic repeat request (HARQ) process regardless of a value of the NDI if a previous uplink grant, delivered to a HARQ entity for a same HARQ process associated with the first dynamic uplink grant, was either an uplink grant received for the MAC entity's configured scheduling RNTI CS-RNTI or a configured uplink grant,
- determine whether the UE is configured with a first indication and whether there is no overlapping physical uplink shared channel (PUSCH) duration of the configured uplink grant a priority of which is higher than a priority of the first dynamic uplink grant, and
- obtain a MAC protocol data unit (PDU) to transmit from a Multiplexing and assembly entity by the HARQ entity corresponding to the HARQ process in a case that the UE is not configured with the first indication or in a case that the UE is configured with the first indication and there is no overlapping PUSCH duration of the configured uplink grant the priority of which is higher than the priority of the first dynamic uplink grant, wherein the first indication is received via a Radio Resource Control (RRC) message and is used to indicate that the UE is configured with a prioritization between overlapping uplink grants based on a Logical Channel priority.

* * * * *